(12) United States Patent
Mertz et al.

(10) Patent No.: US 6,493,489 B2
(45) Date of Patent: Dec. 10, 2002

(54) INTEGRATED COUPLING MODULES FOR HIGH-BANDWIDTH FIBER-OPTIC SYSTEMS

(75) Inventors: Pierre H. Mertz, Sunnyvale, CA (US); Dubravko Babic, Sunnyvale, CA (US)

(73) Assignee: Alvesta Corporation, Sunnyvale, CA (US)

( * ) Notice: Subject to any disclaimer, the term of this patent is extended or adjusted under 35 U.S.C. 154(b) by 42 days.

(21) Appl. No.: 09/726,370

(22) Filed: Nov. 29, 2000

(65) Prior Publication Data

US 2002/0064347 A1 May 30, 2002

(51) Int. Cl.[7] ............................ G02B 6/32; G02B 6/42; G02B 6/36
(52) U.S. Cl. ............................ 385/52; 385/33; 385/39; 385/91
(58) Field of Search ............................ 359/819; 385/31, 385/33, 35, 39, 51, 52, 61, 63, 88, 89, 91–93, 136–137

(56) References Cited

U.S. PATENT DOCUMENTS

| | | | |
|---|---|---|---|
| 5,002,357 A | 3/1991 | Newell | 350/96.2 |
| 5,574,814 A | 11/1996 | Noddings et al. | 385/90 |
| 5,671,311 A | 9/1997 | Stillie et al. | 385/89 |
| 5,781,682 A | 7/1998 | Cohen et al. | 385/89 |
| 5,881,198 A * | 3/1999 | Haake | 385/136 |
| 6,056,448 A * | 5/2000 | Sauter et al. | 385/89 |

* cited by examiner

Primary Examiner—Hemang Sanghavi
Assistant Examiner—Omar Rojas
(74) Attorney, Agent, or Firm—Townsend and Townsend and Crew

(57) ABSTRACT

An integrated and modular coupling module for coupling light between optical devices, such as an optical fiber connector and optoelectronic device, is presented. In this invention, beam-shaping elements and alignment elements are integrated on a single alignment plate in such a way that they maintain a precise physical relationship. The relative physical arrangement between the beam-shaping elements and the alignment elements are configured such that once the alignment elements are engaged with the peripheral devices, accurate optical alignment between the peripheral devices and the coupling module is also attained. The optical coupling module of the present invention enables it to withstand temperatures of 220° C. or higher while maintaining its integrity and performance. The principle of the present invention can also be extended to constructing coupling modules for coupling other types of electromagnetic radiation.

52 Claims, 8 Drawing Sheets

100
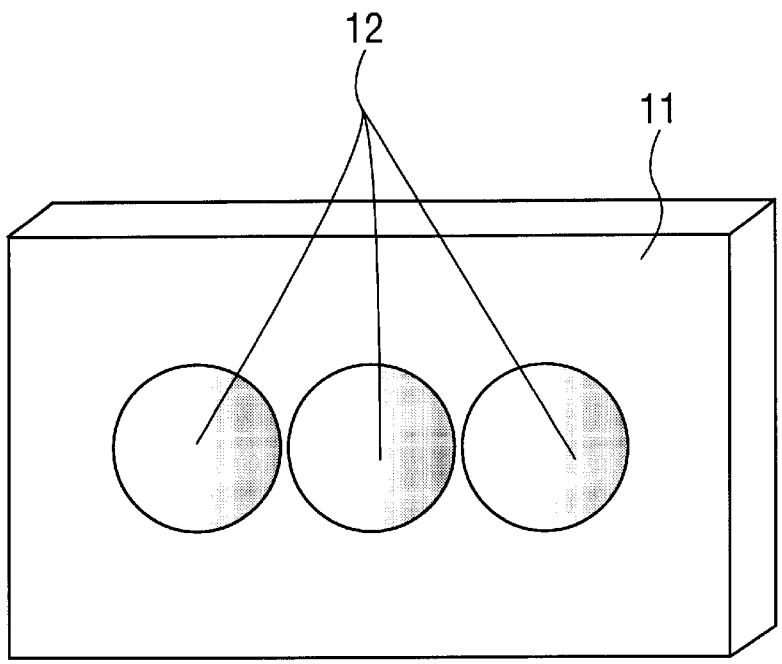
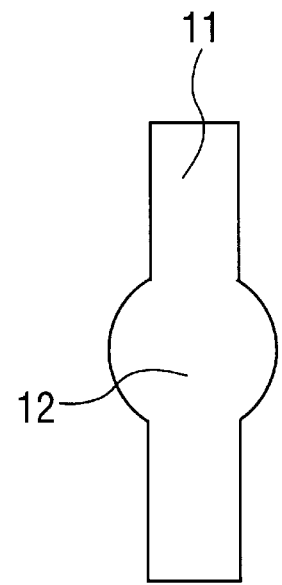
Fig. 1A
(prior art)
Fig. 1B
(prior art)

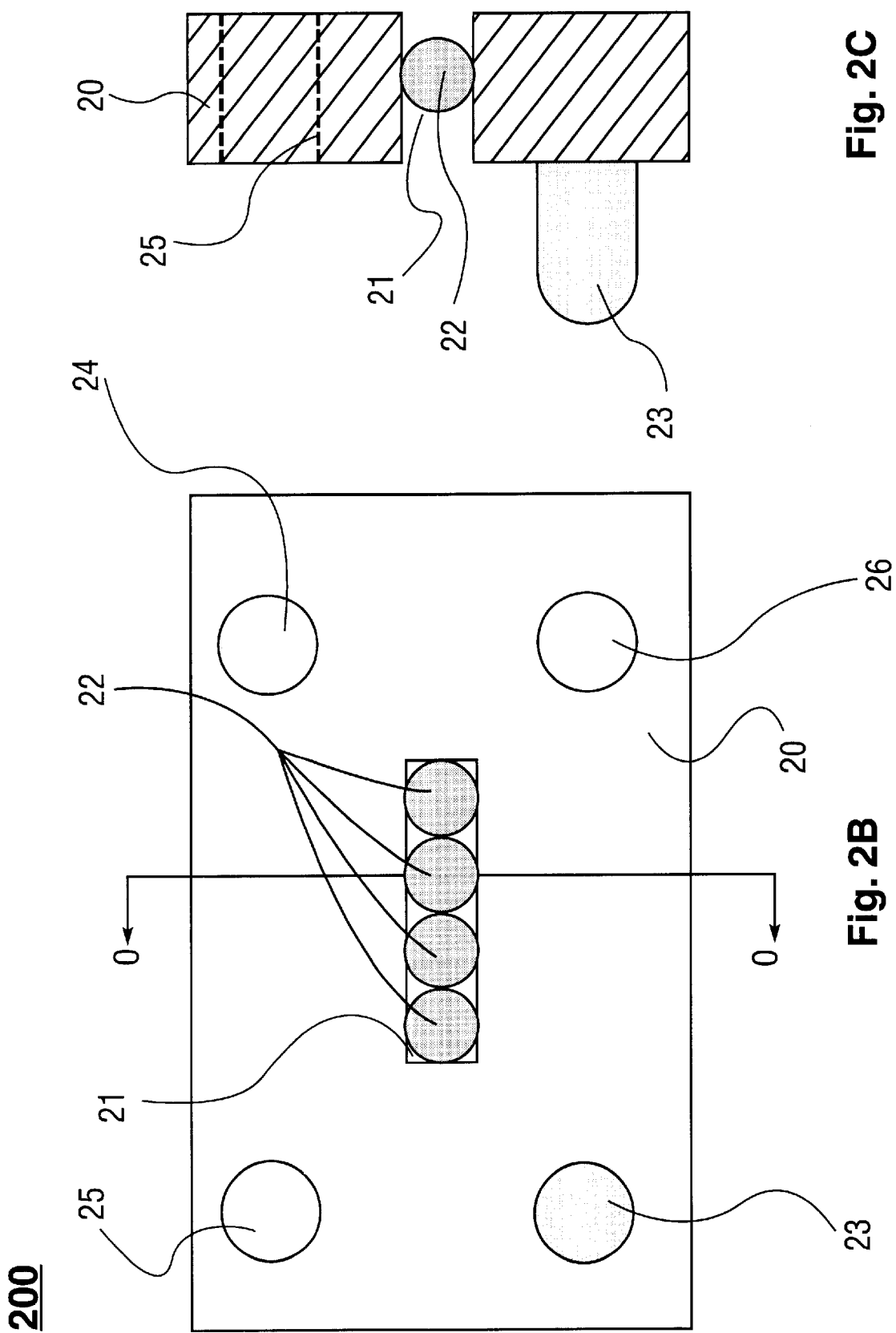

INTEGRATED COUPLING MODULES FOR HIGH-BANDWIDTH FIBER-OPTIC SYSTEMS

FIELD OF THE INVENTION

The present invention relates generally to fiber-optic systems for telecommunication and data-communication applications. More specifically, it relates to a novel type of coupling modules for interconnecting fiber-optic components.

BACKGROUND OF THE INVENTION

The explosive growth of Internet traffic has imposed an unprecedented demand on the existing communications backbone-fiber-optic networks. As the demand for ever greater bandwidth grows, a particular challenge to fiber-optic equipment makers is to increase the bandwidth capacity of fiber-optic transceivers without increasing their overall physical dimensions, so that the users of the fiber-optic transceivers can attain higher bandwidth without increasing the sizes of their network switch boxes.

A crucial step in achieving greater bandwidth capacity while shrinking the package size lies in a simple and reliable way of coupling light between optoelectronic devices (e.g., lasers, light-emitting diodes, and photo-detectors) and optical fibers. This is a difficult task in a system where one or more optical fibers are brought into the proximity of optoelectronic devices by a fiber connector, for the fiber connector is typically aligned using passive alignment means which requires high precision and stringent tolerance. The task becomes more formidable when a fiber ribbon-connector is used to bring a plurality of optical fibers to an array of optoelectronic devices in a parallel fashion.

An effective way of coupling optical fibers in a fiber connector to their corresponding optoelectronic devices is to use an optical coupler that is embedded with optical lenses. The use of lenses to couple light has additional advantages of increasing the working distance and easing the mechanical tolerance imposed on the assembled components. This way of optical coupling, however, requires an accurate and reliable alignment amongst optical fibers in the fiber connector, optical lenses in the coupler, and optoelectronic devices that is to be maintained over a wide range of operating temperatures. In addition, such an optical coupler should be simple in assembly, therefore more reliable in alignment and lower in cost.

Furthermore, as the bandwidth increases, fiber-optic transceivers run at increasingly faster speeds. Accordingly, the manufacturing process for the fiber-optic transceivers has evolved from using electrical pins by way of wave solder processing to Ball Grid Array (BGA) by way of reflow processing. The latter is a surface mount technology. Given that the reflow processing typically occurs at a temperature around 220° C., the optical coupling devices along with other optical components in a high-speed fiber-optic transceiver must be able to withstand this high-temperature treatment, while maintaining their integrity and performance.

Various devices for the interconnections of optical fibers and for the coupling of optical fibers to optoelectronic components have been devised in the art. For instance, U.S. Pat. Nos. 5,574,814, 5,671,311, and 5,781,682 disclose several optical couplers. No optical lenses, however, are incorporated in these prior art coupling devices. Although optical lenses are implemented in an optical coupler disclosed by U.S. Pat. Nos. 5,002,357, the assembly housing of this coupler also contains a fiber connector and an electronic light pulse communication device among other things, thus making it bulky and less modular.

Depicted in FIG. 1 is another prior art optical coupler that incorporates optical lenses. Optical coupler 100 comprises a transparent plastic plate 11 molded with a plurality of plastic lenses 12. Since optical coupler 100 is entirely made of transparent plastic, it will not be able to withstand the high-temperature reflow processing for BGA described above, thus rendering it not applicable to high-bandwidth fiber-optic transceivers. Moreover, given that optical coupler 100 is not equipped with any alignment features, it would be difficult to optically align optical coupler 100 with other optical elements in an accurate and secure fashion.

As fiber-optic systems rapidly grow in modern communications networks, there exists a need for simple, effective, modular, versatile, and low-cost optical coupling devices for high-bandwidth fiber-optic transceivers.

SUMMARY

The aforementioned need in the art is provided by a coupling module for coupling light between two optical devices, such as an optical fiber connector and an optoelectronic device. In one embodiment of the present invention, a coupling module of the present invention comprises an alignment plate, one or more beam-shaping elements, and one or more alignment elements. The beam-shaping elements are embedded in one or more precision slots on the alignment plate, typically by way of press-fitting, such that their respective positions are secured within the alignment plate. The alignment elements, typically in the form of alignment pins and holes, are produced on the alignment plate in such a way that they effectively become an integral part of the alignment plate. The positions of the alignment elements are so chosen that they correspond to the alignment features on peripheral devices, such as a fiber connector and an optoelectronic device. The precision slots and alignment elements can be created in a single manufacturing process, thereby enabling the beam-shaping elements and alignment elements to be aligned in a simple, precise and secure way. Moreover, the relative physical arrangement between the beam-shaping elements and the alignment elements are configured such that once the alignment elements are engaged with the peripheral devices, accurate optical alignment between the peripheral devices and the coupling module is also attained. A coupling module thus constructed maintains a precise optical alignment that is less susceptible to change with temperature variations (e.g., during the high-temperature treatment described above) and other extraneous effects.

In an alternative embodiment of the present invention, the beam-shaping elements are embedded into the precision slots at an elevated temperature, whereby the precision slots expand and/or the alignment plate softens to allow the beam-shaping elements to be press-fit with relative ease. The use of a soft metal like copper for the alignment plate facilitates the press-fitting process. Subsequent cooling to a normal operating temperature then causes the beam-shaping elements to be compressed in their respective positions within the alignment plate. In the coupling module thus constructed, the beam-shaping elements are more firmly embedded in the alignment plate during the normal operation, thereby rendering a more enduring optical alignment.

In another embodiment of the present invention, the alignment plate is made to contain one or more "plungers", comprising one or more foreign materials. The plungers are configured such that one or more gaps form between the embedded plungers and the remaining of the alignment plate, thereby providing one or more precision slots. The incorporation of the plungers in an alignment plate renders a variety of utilities and advantages. For instance, it is easier to create the precision slots by way of embedding the plungers in the alignment plate than having the precision slots directly machined out of the alignment plate, for a combined (and hence larger) area occupied by a plunger and the corresponding precision slot can be readily produced by way of stamping, or other suitable techniques. The plungers can also be of "thermal" type, namely, they are made of materials whose coefficients of thermal expansion are markedly different from that of the alignment plate. In this case, the alignment plate with the embedded "thermal plungers" are heated (or cooled) to an elevated (or lower) temperature, such that the precision slots expand to allow the beam-shaping elements to be press-fit into the precision slots with relative ease. Subsequently cooling (or warming) to a normal operating temperature causes the beam-shaping elements to be firmly compressed in their respective positions within the alignment plate. The incorporation of the "thermal plungers" in an alignment plate advantageously exploits the difference in coefficient of thermal expansion between different materials and thereby enables the beam-shaping elements to be more securely embedded in the alignment plate. Furthermore, the plungers can be of "compression" type, that is, they are made of a soft metal such as copper, thereby allowing the alignment plate to be made of a hard metal, such as stainless steel. An important advantage of using a hard metal for the alignment plate is that the alignment elements (e.g., alignment pins) are more firmly secured in the alignment plate and hence their respective positions are less susceptible to shift. The use of the "compression plungers" permits the beam-shaping elements to be embedded in the precision slots by way of press-fitting. All in all, the use of plungers facilitate the embedding of the beam-shaping elements and enhances the overall stability of optical alignment of the coupling module thus constructed.

In the present invention, the alignment plate is typically made of a metal, such as copper, aluminum, or stainless steel. An advantage of using copper or stainless steel is that the coefficients of thermal expansion of these materials match that of the commonly used materials for making PC boards (e.g., FR4) more closely than the coefficient of thermal expansion of transparent plastic (used in the prior art optical coupler of FIG. 1) does. The alignment plate can also be made of other types of metal (e.g., brass), machinable ceramic, or high-temperature plastic (e.g., opaque plastic) The alignment elements, such as alignment pins and holes, are generally produced by means of machining, casting and stamping, such that they effectively become an integral part of the alignment plate. And the alignment elements and the precision slots can be created in a single manufacturing process. The alignment pins are typically made of metal, such as brass or stainless steel. A beam-shaping element generally refers to an optical assembly having beam-focusing and beam-shaping capabilities. It can be, for instance, a single refractive or diffractive lens, a ball lens, a GRIN lens, or other beam-focusing and beam-shaping means known in the art. It can also comprise an assembly of refractive lenses, diffractive lenses, ball lenses, and GRIN lenses arranged or molded in an array. The use of relatively simple and inexpensive lenses, e.g., glass ball lenses, eases the manufacture process and lowers the cost of the coupling module of the present invention.

It should be noted that various exemplary embodiments in this specification are provided for illustrative purposes, to elucidate the principle and the scope of the present invention. In general, an alignment plate may contain alignment elements in the form of a combination of alignment pins and alignment holes. It may also contain only alignment pins or alignment holes. There can also be situations where an alignment plate does not contain any alignment elements in the form of alignment pins or holes, but is embedded with alignment features in its body and along its edges. Those skilled in the art will know how to design an alignment plate along with appropriate alignment elements and features in accordance with the present invention, for a given application.

In yet another embodiment of the present invention, the coupling module of the present invention further contains one or more transparent windows that cover the beam-shaping elements embedded in the alignment plate. The primary function of the transparent windows is to prevent dust, moisture, and other environmental factors from degrading the performance of the embedded optics. The sealing between the transparent windows and the alignment plate need not necessarily be hermetic. The windows may further contain an optical coating (such as an anti-reflection coating) on their respective outer surfaces, or be placed with a slight tilt to reduce the optical reflection, since optical back-reflection can adversely affect the performance of a fiber-optic transceiver. If so desired, the windows can also be shaped such that they serve as auxiliary optical lenses (or the windows carry appropriate types of optical coating), so as to complement the performance of the beam-shaping elements in the coupling module of the present invention.

The coupling module of the present invention can be employed to optically couple fiber connectors and optoelectronic devices in a passive alignment, an active alignment, or a combination of both. In the passive alignment, the coupling module is equipped with alignment pins and holes designed to mate the corresponding alignment features on the peripheral devices, which may include a fiber connector on one side and an optoelectronic device on the other. In the active alignment, the coupling module is first sandwiched between first and second peripheral devices. After the optical alignment amongst the three devices is obtained, the position of the coupling module is then secured by use of an adhesive agent, such as epoxy or solder. In general, the optical alignment between a fiber connector and a coupling module is engaged in a passive manner by way of alignment pins and holes; whereas the optical alignment between a coupling module and an optoelectronic device may be adjusted actively and then secured by use of an adhesive agent. The passive alignment is generally more secure and less susceptible to extraneous effects. The active alignment, by comparison, imposes fewer physical restrictions on the coupling module and peripheral devices.

All in all, the coupling module of the present invention provides a significant simplification, size and cost reduction in the packaging of optoelectronic devices, while maintaining a more accurate and reliable optical alignment between optical fibers and optoelectronic devices. The unique design of the optical coupling module of the present invention enables it to readily withstand temperature of 220° C. or higher while maintaining its integrity and performance, hence rendering it a desirable candidate for high-speed fiber-optic transceivers. Another advantage of the coupling module of the present invention is that it permits the use of relatively simple and inexpensive lenses, such as glass ball lenses, thereby easing the manufacture process and lowering the overall cost. A further advantage of the present invention is that the coefficient of thermal expansion of the alignment plate can be made to match that of the commonly used materials for making PC boards (e.g., FR4) more closely than the prior art optical coupler (shown in FIG. 1) is able to do. Moreover, being capable of carrying a plurality of beam-shaping elements such as an array of optical lenses, the coupling module of the present invention is particularly suited for coupling multiple optical fibers in a fiber connector to arrayed optoelectronic devices.

It should be noted that other types of optical elements, such as optical switches, filters, isolators and polarization rotators, can be embedded in a coupling module of the present invention, either in addition to or in replacement of the beam-shaping elements discussed above. Moreover, the general principle of the present invention can be applied to constructing coupling modules for coupling other types of electromagnetic radiation—extending beyond the optical regime of the spectrum. For instance, by incorporating appropriate beam-shaping and beam-coupling elements, a coupling module according to the present invention can be used to couple infrared, or microwave radiation.

The novel features of this invention, as well as the invention itself, will be best understood from the following drawings and detailed description.

BRIEF DESCRIPTION OF THE FIGURES

FIGS. 1A–1B shows a prior art optical coupling device;

FIGS. 2A–2C depict a perspective view, a front view and a side cross-sectional view of a first embodiment of a coupling module of the present invention;

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 2A:
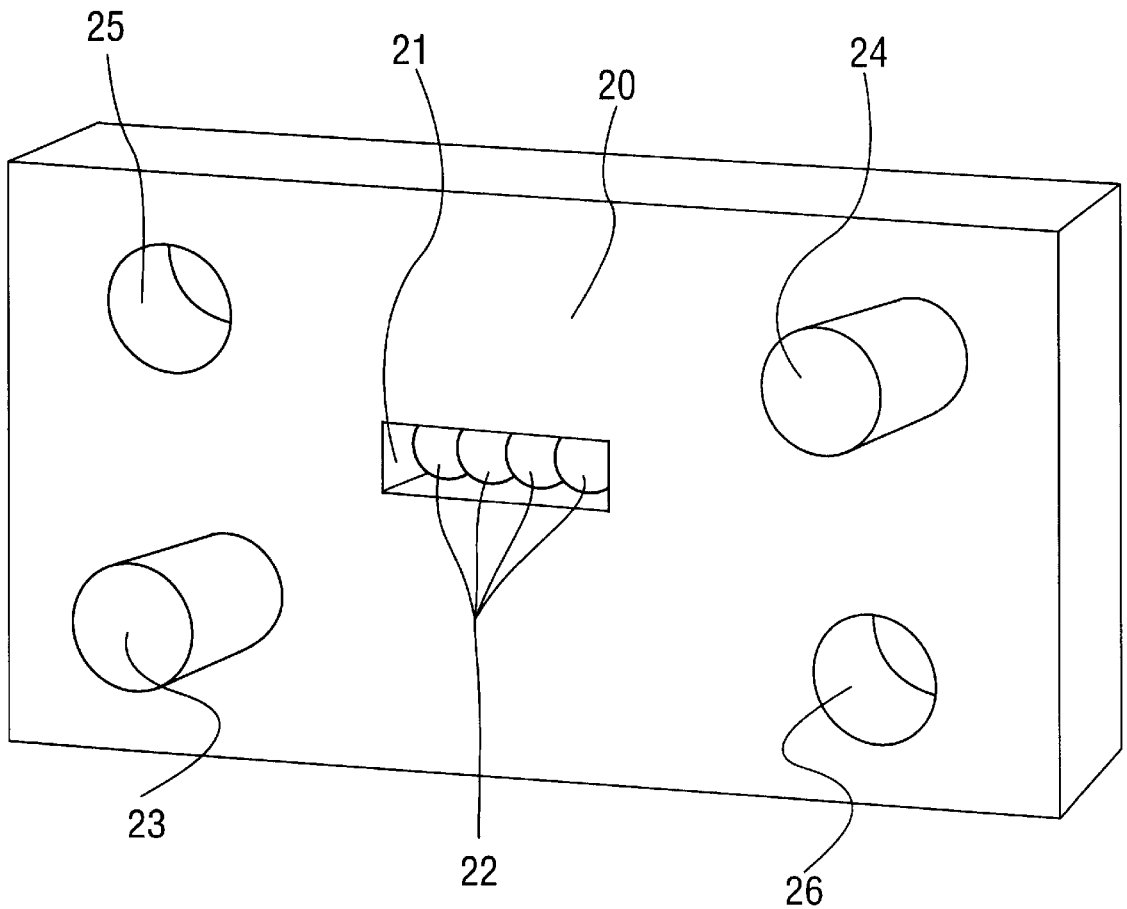

FIGS. 2A–2C depict a first exemplary embodiment of a coupling module of the present invention. In FIG. 2A is a perspective view of coupling module 200, comprising an alignment plate 20, a precision slot 21, one or more beam-shaping elements in the form of a plurality of optical lenses 22, and a plurality of alignment elements in the form of alignment pins 23, 24 and alignment holes 25, 26. Precision slot 21 is contained in alignment plate 20, and lenses 22 are in turn embedded in precision slot 21. Alignment pins 23, 24 and alignment holes 25, 26 are typically created on alignment plate 20 by way of machining, casting, or stamping. FIG. 2B provides a front view of coupling module 200; and FIG. 2C shows a side cross-sectional view of coupling module 200 along a representative line O-O' in FIG. 2B. (Note: alignment pin 24 and alignment hole 26 in FIG. 2B are not visible from the cross-sectional view of FIG. 2C.)

A beam-shaping element in this specification and appending claims should be construed in a broad sense as referring to any optical assembly having beam-focusing, beam-shaping, and other beam-coupling capabilities. For example, it can be a single refractive lens, a diffractive lens, a ball lens, or a GRIN lens. It can also be an assembly of refractive lenses, diffractive lenses, ball lenses, GRIN lenses, or combinations of these lenses arranged (or molded) in an array. An advantage of the coupling module of the present invention is that it allows relatively simple and inexpensive lenses, such as glass ball lenses, to be used, thereby easing the manufacture process and lowering the overall cost. The optical lenses are typically made of glass. They may also comprise other transparent materials that can withstand the high-temperature treatment in the reflow process described above. Moreover, an alignment plate can contain different types of beam-shaping elements in one or more precision slots.

There can be a plurality of precision slots created in an alignment plate. The precision-slots are shaped such to accommodate the geometric attributes of the beam-shaping elements to be embedded. In order to secure the beam-shaping elements in their respective positions within the precision slots, the press-fitting technique is typically employed to embed the beam-shaping elements. To facilitate this process, the alignment plate can be made of a soft metal, such as copper or aluminum, whereby under mechanical pressure the alignment plate readily deforms so as to allow the beam-shaping elements to fit into their respective positions. Alternatively, the beam-shaping elements can be embedded in an alignment plate at an elevated temperature, such that the alignment plate softens and/or the precision slots expand, thereby permitting the beam-shaping elements to be press-fit into their respective positions with relative ease. Subsequent cooling of the alignment plate along with the embedded beam-shaping elements to a normal operating temperature causes the beam-shaping elements to be firmly compressed in their respective positions within the alignment plate.

The alignment elements are generally in the form of alignment pins and holes. The alignment pins and the alignment plate can be machined out of the same piece of a material, such as metal, machinable ceramic, or high-temperature plastic. The alignment pins can also be produced separately, and then mechanically coupled to the alignment plate by way of casting or stamping. The alignment holes are contained within the alignment plate, produced by means of machining or casting.

It should be noted that the embodiments of FIGS. 2A–2C and the following figures are provided for illustrative purposes, to elucidate the principle and the scope of the present invention. In general, an alignment plate may contain alignment elements in the form of a combination of alignment pins and alignment holes, as exemplified in FIGS. 2A–2C. It may also contain only alignment pins or alignment holes. There can also be situations where an alignment plate does not contain any alignment elements in the form of alignment pins or holes, but is embedded with alignment features in its body and along its edges. Those skilled in the art will know how to design an alignment plate along with appropriate alignment elements and features in accordance with the present invention, for a given application.

An important advantage of the present invention is that the precision slots and the alignment elements can be created in a single manufacturing process. (For instance, the precision slots can be produced and the alignment pins stamped in a single machining process.) This provides a simple, precise and sustainable way of aligning the beam-shaping elements thus embedded and the alignment elements on an alignment plate.

Figures 3A, 3B:
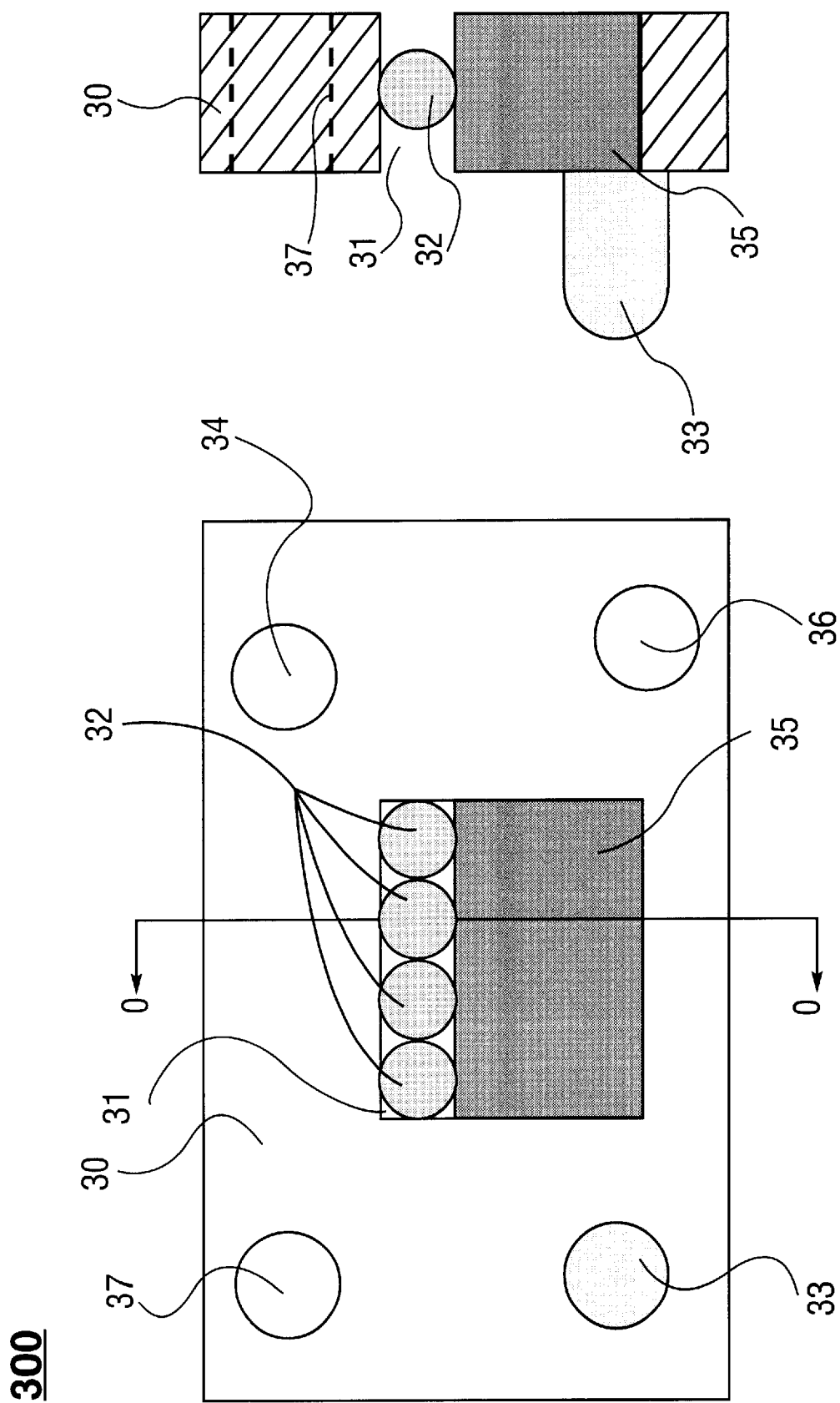
FIGS. 3A–3B show a front view and a side cross-sectional view of a second embodiment of a coupling module according to the present invention.

FIGS. 3A–3B show a second exemplary embodiment of a coupling module of the present invention, containing a piece of "foreign" material, termed a "plunger" hereinafter. FIG. 3A depicts a front view of coupling module 300, comprising an alignment plate 30; one or more beam-shaping elements in the form of a plurality of optical lenses 32; a plurality of alignment elements in the form of alignment pins 33, 34 and alignment holes 36, 37; and a plunger 35. A gap formed between alignment plate 30 and plunger 35 constitutes a precision slot 31, in which lenses 32 are embedded. (This is typically accomplished by creating a large hole of the combined size of the plunger and the desired precision slot, followed by embedding the plunger into the large hole in the alignment plate.) FIG. 3B shows a side cross-sectional view of coupling module 300 along a representative line O-O' in FIG. 3A, providing an alternative perspective of the physical arrangement amongst alignment plate 30, precision slot 31, optical lenses 32, alignment pin 33, alignment hole 37, and plunger 35. (Note: alignment pin 34 and alignment hole 36 in FIG. 3A are not visible from the cross-sectional view of FIG. 3B.)

The incorporation of plunger 35 in alignment plate 30, as exemplified in the above embodiment, renders a variety of utilities and advantages. First, it is easier to create precision slot 31 by way of embedding plunger 35 in alignment plate 30 than having precision slot 31 directly machined out of alignment plate 30, for a combined (and hence larger) area occupied by plunger 35 and precision slot 31 can be more readily produced (by way of stamping, for instance). Second, plunger 35 can be of "thermal" type, namely, it is made of a material whose coefficient of thermal expansion is markedly different from that of alignment plate 30. For instance, plunger 35 can be made of a material whose coefficient of thermal expansion is significantly lower than the coefficient of thermal expansion of alignment plate 30. In this case, raising the temperature of alignment plate 30 enlarges precision slot 31, thereby allowing beam-shaping elements in the form of lenses 32 to be press-fit into precision slot 31 with relative ease. After lenses 32 are embedded and properly aligned, alignment plate 30 is then brought back to a normal operating temperature, causing lenses 32 to be compressed and hence firmly "locked" in their respective positions within alignment plate 30. Alternatively, plunger 35 can be made of a material whose coefficient of thermal expansion is significantly higher than that of alignment plate 30. In this scenario, lowering the temperature of alignment plate 30 enlarges precision slot 31, thereby permitting lenses 32 to be press-fit into precision slot 31 with relative ease. Subsequent warming to the normal operating temperature causes lenses 32 to be compressed and securely locked in their respective positions within alignment plate 30. Third, plunger 35 can be of "compression" type, that is, it is made of a soft metal such as copper, thereby allowing alignment plate 30 to be made of a hard metal, such as stainless steel. An advantage of using a hard metal for alignment plate 30 is that the alignment elements, such as alignment pins 33, 34, are less susceptible to shift in position, therefore rendering the optical alignment more reliable. The use of a "soft" plunger 35 enables beam-shaping elements such as optical lenses 32 to be embedded in a "hard" alignment plate 30 by way of press-fitting.

For an alignment plate made of metal, such as copper or aluminum, the corresponding "thermal plunger" can be made of Molybdenum, stainless steel, or other materials whose coefficients of thermal expansion are significantly lower than that of the alignment plate. Moreover, if the alignment plate is made of a hard metal such as stainless steel, Molybdenum, or brass, the corresponding "compression" plungers can be made of copper, aluminum, or plastic.

There can be a plurality of various types of plungers embedded and correspondingly a plurality of precision slots formed in an alignment plate. As such, the incorporation of plungers in a coupling module of the present invention facilitates the embedding of the beam-shaping elements and enhances the overall stability of optical alignment of the coupling module thus constructed.

It should be pointed out that in applications where a quick and simple assembly is desired, the beam-shaping elements can be fit into the corresponding precision slots and then secured in their respective positions by use of an adhesive agent, such as epoxy. Care must be exercised in such a case, so as to avoid any adverse effect on the performance of the embedded beam-shaping elements.

Figure 4B:
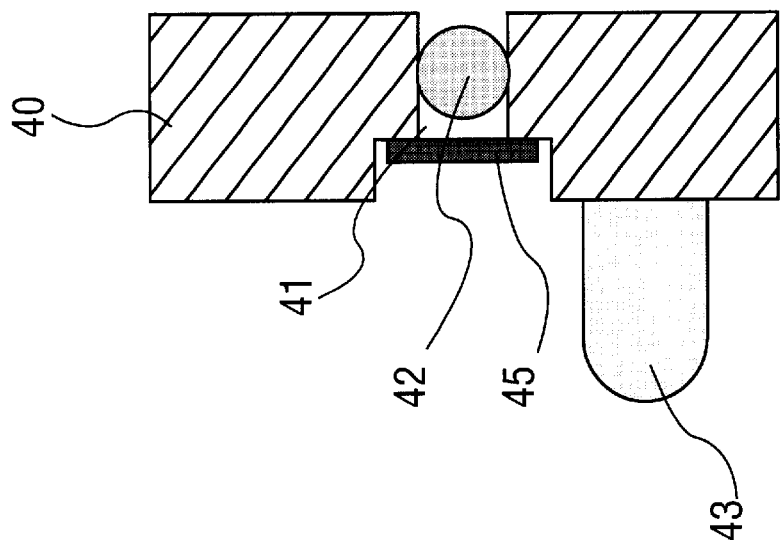
FIGS. 4A–4B depict a front view and a side cross-sectional view of a third embodiment of a coupling module according to the present invention.
Figure 4A:
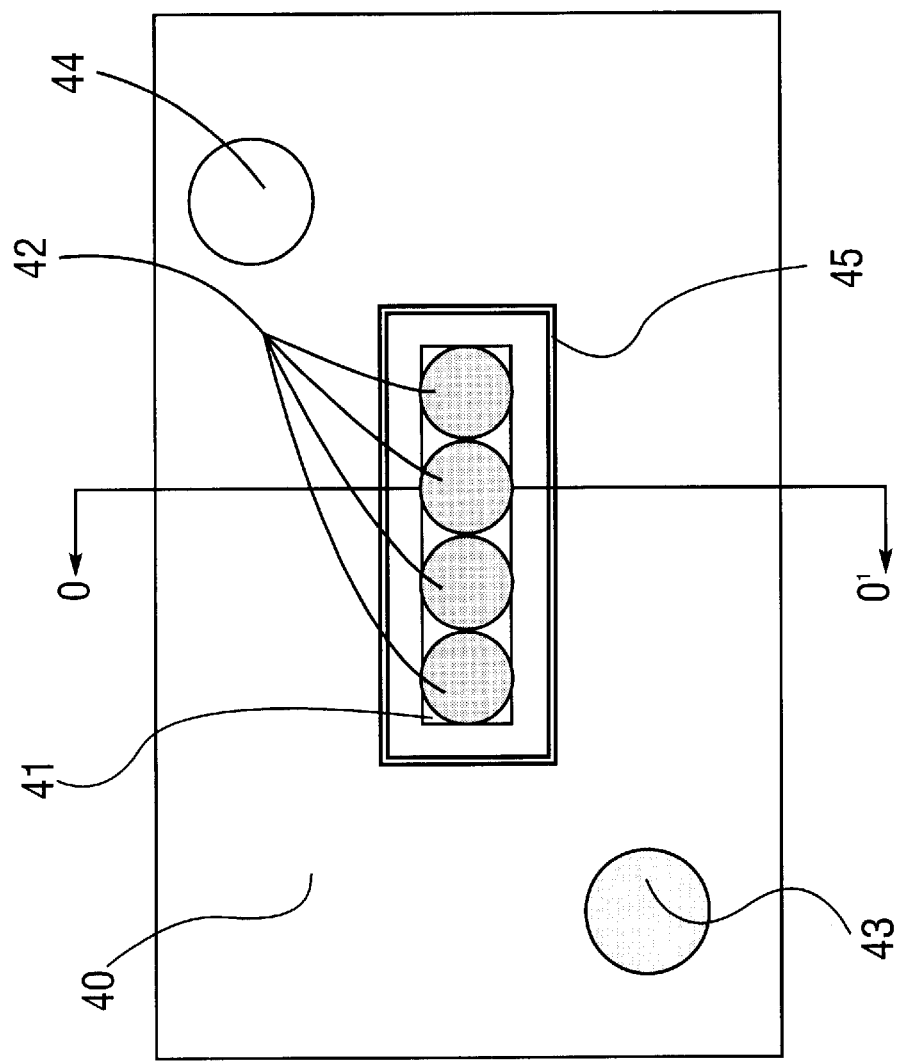

A coupling module of the present invention can further contain one or more transparent windows covering the beam-shaping elements embedded in the alignment plate. The primary function of these windows is to prevent dust, moisture and other environmental factors from degrading the performance of the embedded beam-shaping elements. By way of example, FIGS. 4A–4B depict a third embodiment of a coupling module of the present invention, equipped with a transparent window. FIG. 4A shows a front view of coupling module 400, comprising an alignment plate 40, a precision slot 41, one or more beam-shaping elements in the form of a plurality of lenses 42 embedded in precision slot 41, a plurality of alignment elements in the form of alignment pin 43 and alignment hole 44, and a transparent window 45. The sealing between alignment plate 40 and transparent window 45 need not necessarily be hermetic. FIG. 4B shows a side cross-sectional view of optical coupling module 400 along a representative line O-O' in FIG. 4A, providing an alternative perspective of the physical arrangement amongst alignment plate 40, precision slot 41, lenses 42, alignment pin 43 and alignment hole 44, and transparent window 45.

In the above embodiment, window 45 is typically made of transparent glass. In applications where it is desired to have transparent window 45 hermetically sealed to alignment plate 40, a glass-to-metal seal may be utilized. This can be accomplished by first applying a metal coating to the edges of transparent window 45 for the purpose of wetting the solder, and then soldering the metal-coasted window to alignment plate 40. Window 45 can also be attached to alignment plate 40 by use of a high-temperature epoxy, or a high-temperature transparent tape.

There can be a plurality of transparent windows attached to an alignment plate, covering various beam-shaping elements embedded in a plurality of precision slots contained in the alignment plate. A window may be flat, merely preventing dust, moisture and other environmental factors from degrading the optical performance of the embedded lenses. A window may also be covered with an optical coating on its outer surface, such as an anti-reflection or filtering coating. It may also be placed with a slight tilt to reduce the optical reflection, for optical back-reflection can adversely affect the overall performance of a fiber-optic transceiver. Moreover, a transparent window may be shaped such to serve as an auxiliary optical element (or it may carry other appropriate types of optical coating), so as to complement the performance of the embedded beam-shaping elements it covers.

A coupling module of the present invention may contain a combination of one or more plungers for facilitating the embedding of the beam-shaping elements, one or more transparent windows for protecting the embedded beam-shaping elements, in addition to the beam-shaping elements and alignments elements on its alignment plate. A skilled artisan can design an optical coupling module in accordance with the present invention to best suit a given application.

Figures 5A, 5B, 5C:
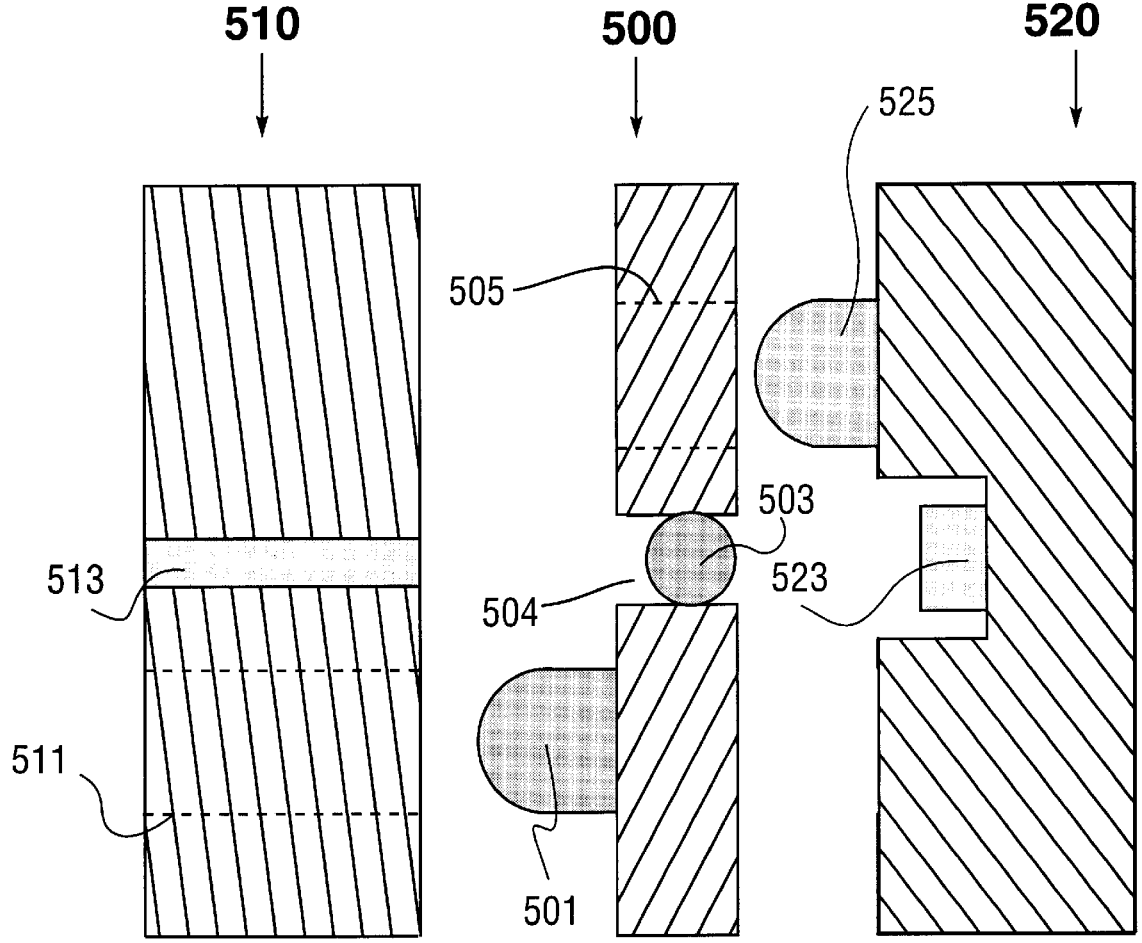
FIGS. 5A–5D depict an exemplary embodiment illustrating how a coupling module of the present invention is engaged with a fiber connector on one side and an optoelectronic device on the other by way of passive alignment.
Figure 5D:
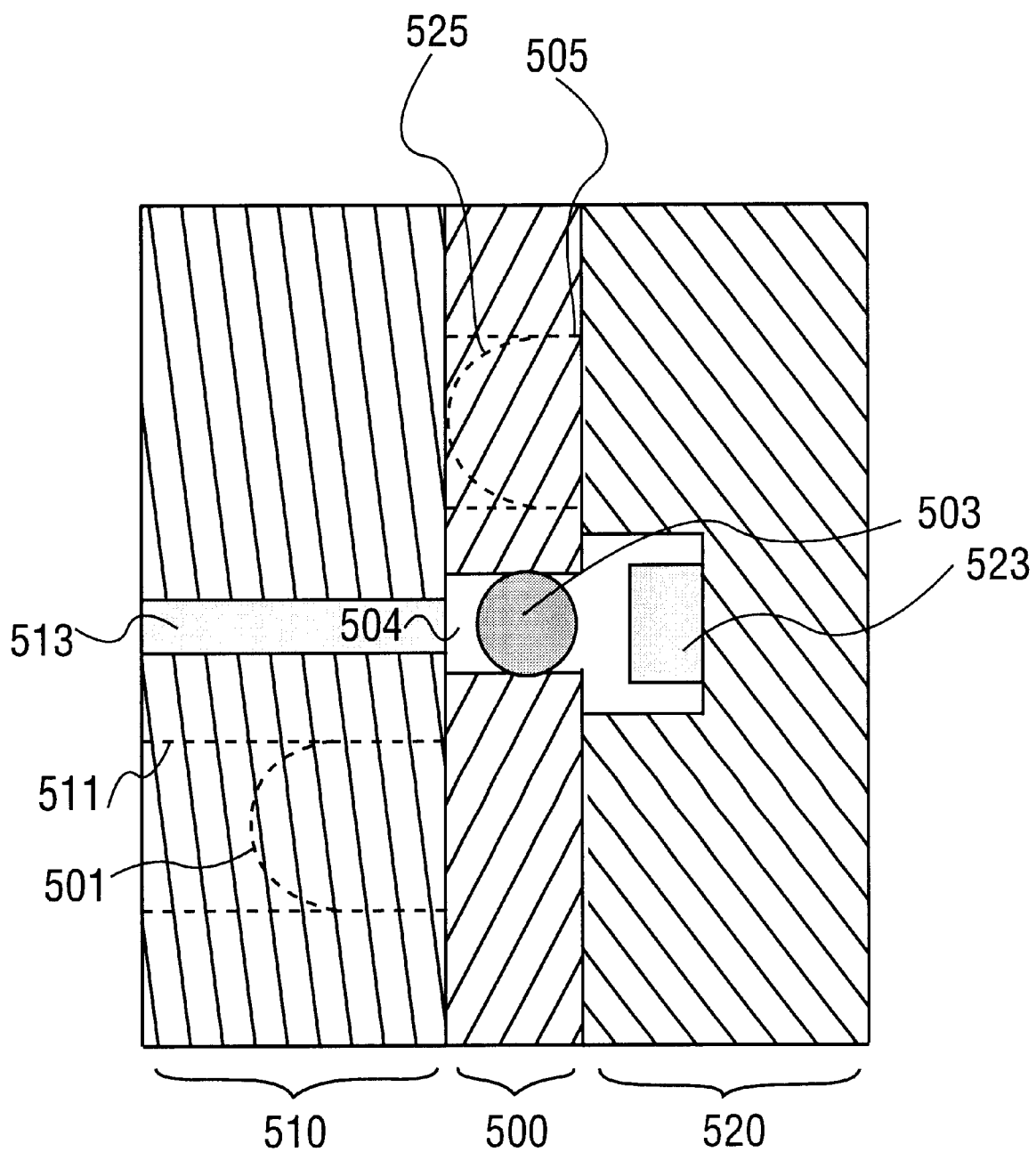

FIGS. 5A–5D depict an exemplary embodiment illustrating how a coupling module of the present invention mates a fiber connector on one side and an optoelectronic device on the other side in a passive alignment. FIG. 5A shows a side cross-sectional view of a fiber connector 510, containing one or more mating holes 511 for alignment and one or more optical fibers 513 for transmitting light. FIG. SB depicts a side cross-sectional view of a coupling module 500, comprising one or more alignment pins 501, one or more alignment holes 505, and one or more beam-shaping elements 503 embedded in one or more precision slots 504. As a way of example, coupling module 500 is shown in the embodiment of FIGS. 2A–2C, and FIG. 5B can be taken as showing the same cross-section as is shown in FIG. 2B. It should be noted, however, that any other embodiment of a coupling module in accordance with the present invention may be alternatively used. FIG. 5C depicts a side cross-sectional view of an optoelectronic device 520, containing one or more mating pins 525 and an optical element 523. (Note: fiber connector 510, coupling module 500, and optoelectronic device 520 may contain additional mating pins and holes that are not visible from the cross-sectional views of FIGS. 5A–5C.) All three cross-sections shown in FIGS. 5A–5C are such that they provide a cross-section of a combined system, as shown in FIG. 5D. Illustrated in FIG. 5D is a cross-sectional view of the combined system in which coupling module 500 is sandwiched between fiber connector 510 and optoelectronic device 520, with alignment pins 501 being engaged with mating holes 511 on fiber connector 510 and mating pins 525 from optoelectronic device 520 being inserted into alignment holes 505. As such, beam-shaping elements 503 are in precise optical communication with optical fibers 513 on one side and with optical element 523 on the other. In this arrangement, various alignment pins and holes are configured such that once they are fully engaged in their respective positions, coupling module 500 optically aligns fiber connector 510 with optoelectronic device 520 in an accurate and secure manner.

Figure 6:
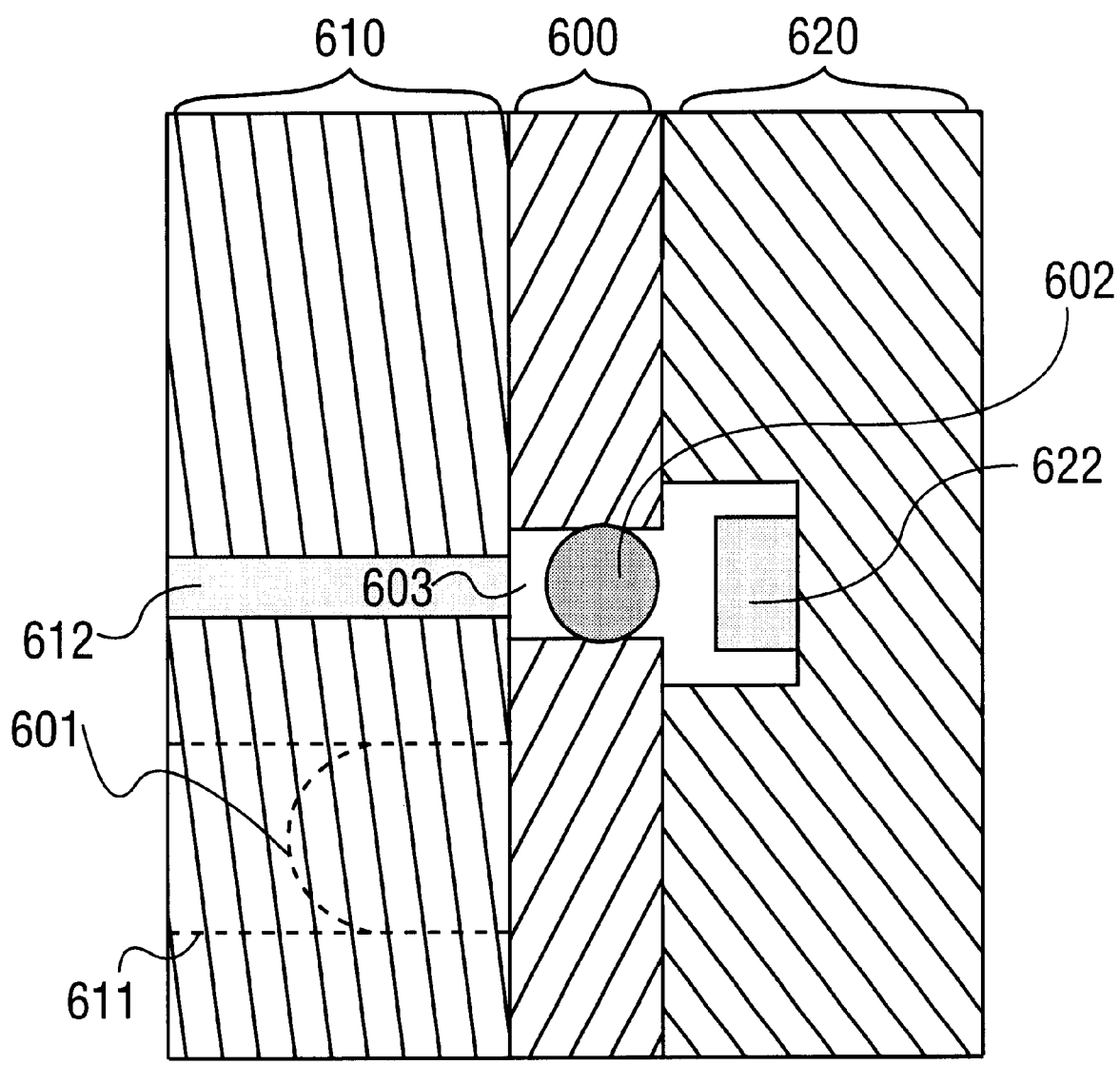
FIG. 6 shows another exemplary embodiment illustrating how a coupling module of the present invention is engaged with a fiber connector by way of passive alignment, and optically coupled to an optoelectronic device in an active alignment.

In the embodiment of FIGS. 5A–5D, coupling module 500 optically couples fiber connector 510 to optoelectronic device 520 by way of engaging passive alignment elements such as alignment pins and holes. Alternatively, the coupling between a fiber connector and an optoelectronic device can be obtained by employing a scheme involving both passive and active alignments. FIG. 6 provides an exemplary embodiment illustrating how a coupling module of the present invention optically couples a fiber connector to an optoelectronic device by way of both passive and active alignments. In this embodiment, a coupling module 600 is equipped with one or more alignment pins 601 and contains one or more beam-shaping elements 602 embedded in one or more precision slots 603. (Note: coupling module 600 may be configured in a way similar to the embodiment illustrated in FIGS. 2A–2C, except it may contain no alignment holes, or alignment holes located such that they are not visible from the cross-sectional view of FIG. 6. And the cross-sectional view of coupling module 600 shown in FIG. 6D may be taken as showing the same cross-section as is shown in FIG. 2B. Any other embodiment of a coupling module in accordance with the present invention may be alternatively used.) A fiber connector 610, carrying one or more optical fibers 612, is equipped with one or more mating holes 611. An optoelectronic device 620 contains an optical element 622, however bearing no alignment elements. In a hybrid of passive and active alignments, alignment pins 601 are first inserted into mating holes 611 on fiber connector 610, such that beam-shaping elements 602 are in direct optical communication with optical fibers 612. After ensuring that beam-shaping elements 602 are in precise light communication with optical element 622 on optoelectronic device 620, an adhesive agent (such as epoxy) is applied between coupling module 600 and optoelectronic device 620 to secure the optical alignment. An advantage of such an alignment scheme is that fewer alignment elements, such as alignment pins and holes, need to be produced on the alignment plate of coupling module 600 and on optoelectronic device 620, thus making the coupling module more adaptable. A disadvantage of this approach is that the optical alignment may be less secure and more susceptible to external effects.

A coupling module of the present invention may also be made with no alignment elements, allowing it to be a "universal" and modular device for coupling light in a variety of applications, including but not limited to fiber-optic applications. A skilled artisan can design and construct a suitable coupling module in accordance with the principle of the present invention, for a given application.

An important advantage of the coupling module of the present invention is its integration of beam-shaping elements and alignment elements into a single alignment plate, thereby ensuring a precise and reliable physical arrangement between the beam-shaping elements and the alignment elements. Moreover, the physical arrangement between the beam-shaping elements and the alignment elements in the coupling module of the present invention is configured such that once the alignment elements are engaged with the peripheral devices, accurate optical alignment between the peripheral devices and the coupling module is also attained.

Furthermore, the unique design of the optical coupling module of the present invention enables it to readily withstand temperatures of 220° C. or higher while maintaining its integrity and performance, hence rendering it a desirable candidate for high-bandwidth fiber-optic transceivers, and other high-bandwidth transmitting and receiving modules. By use of relatively simple and inexpensive lenses (such as glass ball lenses) as the beam-shaping elements, the optical coupling module of the present invention is inherently simple in assembly and lower in cost. Additionally, by making the alignment plate out of a metal such as copper or stainless steel, the coefficient of thermal expansion of the alignment plate matches that of the commonly used materials for making PC boards (e.g., FR4) more closely. Additional advantages of the optical coupling module of the present invention include its integrated structure and compact size.

All in all, the coupling module of the present invention provides a significant simplification, size and cost reduction in the packaging of fiber-optic transceivers, while providing more accurate and reliable optical coupling between optical fibers and optoelectronic devices. Furthermore, being capable of carrying a plurality of beam-shaping elements (e.g., optical lenses), the coupling module of the present invention is particularly suited for coupling multiple optical fibers in a fiber connector to arrayed optoelectronic devices.

It should be noted that other types of optical devices, such as optical switches, filters, isolators and polarization rotators, can be embedded in a coupling module of the present invention, either in addition to or in replacement of the beam-shaping elements discussed above. Moreover, the general principle of the present invention can be applied to constructing coupling modules for coupling other types of electromagnetic radiation—extending beyond the optical regime of the spectrum. For instance, by incorporating appropriate beam-shaping and beam-coupling elements, a coupling module according to the present invention can be used to couple infrared, or microwave radiation.

Although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A coupling module comprising:
   a) an alignment plate;
   b) one or more beam-shaping elements substantially embedded in said alignment plate; and
   c) one or more alignment elements produced on said alignment plate, wherein said alignment plate further comprises one or more plungers substantially embedded in said alignment plate, whereby one or more precision slots are formed between said embedded one or more plungers and said alignment plate, and said one or more beam-shaping elements are substantially embedded into said one or more precision slots.

2. The coupling module of claim 1 wherein said one or more alignment elements comprise alignment pins.

3. The coupling module of claim 2 wherein said alignment pins are produced on said alignment plate by a process selected from the group consisting of machining, casting, and stamping.

4. The coupling module of claim 1 wherein said one or more alignment elements comprise alignment holes contained within said alignment plate.

5. The coupling module of claim 1 wherein said one or more beam-shaping elements comprise one or more elements selected from the group consisting of refractive lenses, diffractive lenses, ball lenses, and GRIN lenses.

6. The coupling module of claim 5 wherein each of said one or more beam-shaping elements comprises an array of a plurality of elements selected from the group consisting of refractive lenses, diffractive lenses, ball lenses, and GRIN lenses.

7. The coupling module of claim 1 wherein each of said one or more beam-shaping elements comprises one or more materials selected from the group consisting of glass and plastic.

8. The coupling module of claim 1 wherein said one or more precision slots are shaped such that said one or more beam-shaping elements fit snugly into said one or more precision slots.

9. The coupling module of claim 1 wherein said alignment plate comprises a material selected from the group consisting of metal, plastic, and ceramic.

10. The coupling module of claim 9 wherein said alignment plate comprises an element selected from the group consisting of copper, aluminum, stainless steel, brass, and opaque plastic.

11. The coupling module of claim 1 wherein said one or more plungers have coefficients of thermal expansion substantially different from a coefficient of thermal expansion of said alignment plate.

12. The coupling module of claim 11 wherein said alignment plate comprises a material selected from the group consisting of copper and aluminum, and wherein said one or more plungers comprise a material selected from the group of Molybdenum and stainless steel.

13. The coupling module of claim 11 wherein said alignment plate comprises an element selected from the group consisting of Molybdenum and stainless steel, and wherein said one or more plungers comprise a material selected from the group consisting of copper and aluminum.

14. The coupling module of claim 1 wherein said one or more plungers are made of a soft material, and wherein said alignment plate is made of a hard material.

15. The coupling module of claim 14 wherein said soft material comprises an element selected from the group consisting of copper, aluminum and plastic, and wherein said hard material comprises an element selected from the group consisting of stainless steel, Molybdenum, brass, and ceramic.

16. The coupling module of claim 1 wherein said one or more plungers are made of a hard material, and wherein said alignment plate is made of a soft material.

17. The coupling module of claim 16 wherein said soft material comprises an element selected from the group consisting of copper, aluminum and plastic, and wherein said hard material comprises an element selected from the group consisting of stainless steel, Molybdenum, brass, and ceramic.

18. The coupling module of claim 1 wherein said one or more precision slots are shaped such that said one or more beam-shaping elements fit snugly into said one or more precision slots.

19. The coupling module of claim 1 wherein said one or more beam-shaping elements are embedded into their respective positions within said one or more precision slots by way of press-fitting.

20. The coupling module of claim 1 further comprising one or more transparent windows attached to said alignment plate, whereby said one or more beam-shaping elements are covered by said one or more transparent windows.

21. The coupling module of claim 20 wherein said one or more transparent windows are made of glass and said alignment plate is made of a metal, and wherein said one or more transparent windows are attached to said alignment plate via a glass-to-metal solder joint.

22. The coupling module of claim 20 wherein said one or more transparent windows are attached to said alignment plate by an adhesive agent.

23. The coupling module of claim 20 wherein said one or more transparent windows further contain an optical coating on their respective outer surfaces.

24. The coupling module of claim 20 wherein said one or more transparent windows are tilted so as to reduce optical reflection on their respective outer surfaces.

25. The coupling module of claim 20 wherein said one or more transparent windows are shaped such that they serve as auxiliary optical elements, so as to complement the performance of said one or more beam-shaping elements.

26. The coupling module of claim 1 further comprising first and second peripheral devices, wherein said coupling module optically couples said first peripheral device to said second peripheral device.

27. The coupling module of claim 26 wherein said first and second peripheral devices are equipped with mating alignment features, and wherein said one or more alignment elements correspond with said mating alignment features, whereby said coupling module optically aligns said first peripheral device with said second peripheral device.

28. The coupling module of claim 26 wherein either of said first and second peripheral devices comprises an element selected from the group consisting of fiber-optic connectors, fiber-optic ribbon-connectors, and optoelectronic devices.

29. A method of making an integrated coupling module, comprising:
   a) producing one or more precision slots on an alignment plate;
   b) producing one or more alignment elements on said alignment plate, and
   c) embedding one or more beam-shaping elements into said one or more precision slots, wherein said step a) is carried out by way of embedding one or more plungers into said alignment plate, whereby one or more gaps formed between said embedded one or more plungers and said alignment plate constitute said one or more precision slots.

30. The method of claim 29 wherein said steps a) and b) are carried out in a single manufacturing process.

31. The method of claim 29 wherein said step c) is carried out by way of press-fitting.

32. The method of claim 29 wherein said one or more precision slots are shaped such that said one or more beam-shaping elements fit snugly into said one or more precision slots.

33. The method of claim 29 wherein said step c) is carried out by way of heating said alignment plate to a temperature higher than an operating temperature, such that said one or more precision slots expand to allow said one or more beam-shaping elements to be press-fit into their respective positions within said one or more precision slots.

34. The method of claim 33 further comprising the step of cooling said alignment plate along with said embedded one or more beam-shaping elements to said operating temperature, whereby said one or more beam-shaping elements are compressed within said one or more precision slots.

35. The method of claim 29 wherein said one or more plungers are made of one or more materials having coefficients of thermal expansion substantially different from a coefficient of thermal expansion of said alignment plate.

36. The method of claim 35 wherein said step c) is carried out by way of heating said alignment plate to a temperature higher than an operating temperature, such that said one or more precision slots expand to allow said one or more beam-shaping elements to be press-fit into their respective positions within said one or more precision slots.

37. The method of claim 36 further comprising the step of cooling said alignment plate along with said embedded one or more beam-shaping elements to said operating temperature, whereby said one or more beam-shaping elements are compressed within said one or more precision slots.

38. The method of claim 35 wherein said step c) is carried out by way of cooling said alignment plate to a temperature lower than an operating temperature, such that said one or more precision slots expand to allow said one or more beam-shaping elements to be press-fit into their respective positions within said one or more precision slots.

39. The method of claim 38 further comprising the step of heating said alignment plate along with said one or more beam-shaping elements to said operating temperature, whereby said one or more beam-shaping elements are compressed within said one or more precision slots.

40. The method of claim 29 wherein said one or more plungers are made of a hard material, and wherein said alignment plate is made of a soft material.

41. The method of claim 29 wherein said one or more plungers are made of a soft material, and said alignment plate is made of a hard material.

42. The method of claim 29 further comprising the step of securing said one or more beam-shaping elements in their respective positions within said one or more precision slots by way of an adhesive agent.

43. The method of claim 29 wherein said step b) is carried out by one or more processes selected from the group consisting of machining, casting and stamping, and wherein said one or more alignment elements comprise one or more elements selected from the group consisting of alignment pins and holes.

44. The method of claim 29 further comprising the step of mating said one or more alignment elements with corresponding alignment features on first and second peripheral devices, such that said coupling module optically aligns said first peripheral device with said second peripheral device.

45. The method of claim 29 further comprising the step of attaching one or more transparent windows onto said alignment plate, whereby said one or more beam-shaping elements are covered by said one or more transparent windows.

46. The method of claim 45 wherein said one or more transparent windows are made of glass and said alignment plate is made of metal, and wherein said one or more transparent windows are attached to said alignment plate by way of a glass-to-metal solder joint.

47. The method of claim 45 wherein said one or more transparent windows are attached to said alignment plate by way of an adhesive agent.

48. The method of claim 45 further comprising the step of applying an optical coating to respective outer surfaces of said one or more transparent windows.

49. The method of claim 45 further comprising the step of tilting said one or more transparent windows so as to reduce optical reflection on their respective outer surfaces.

50. The method of claim 45 further comprising the step of shaping said one or more transparent windows in such a way that they serve as auxiliary optical lenses, so as to complement the performance of said one or more beam-shaping elements.

51. The method of claim 29 wherein each of said one or more beam-shaping elements comprises one or more elements selected from the group consisting of refractive lenses, diffractive lenses, ball lenses, and GRIN lenses.

52. The method of claim 29 further comprising the step of using said coupling module to optically align a first peripheral device to a second peripheral device.

\* \* \* \* \*